J. M. & R. R. DENNIS.
PNEUMATIC WHEEL.
APPLICATION FILED NOV. 23, 1911.
1,047,620.
Patented Dec. 17, 1912.
3 SHEETS—SHEET 1.
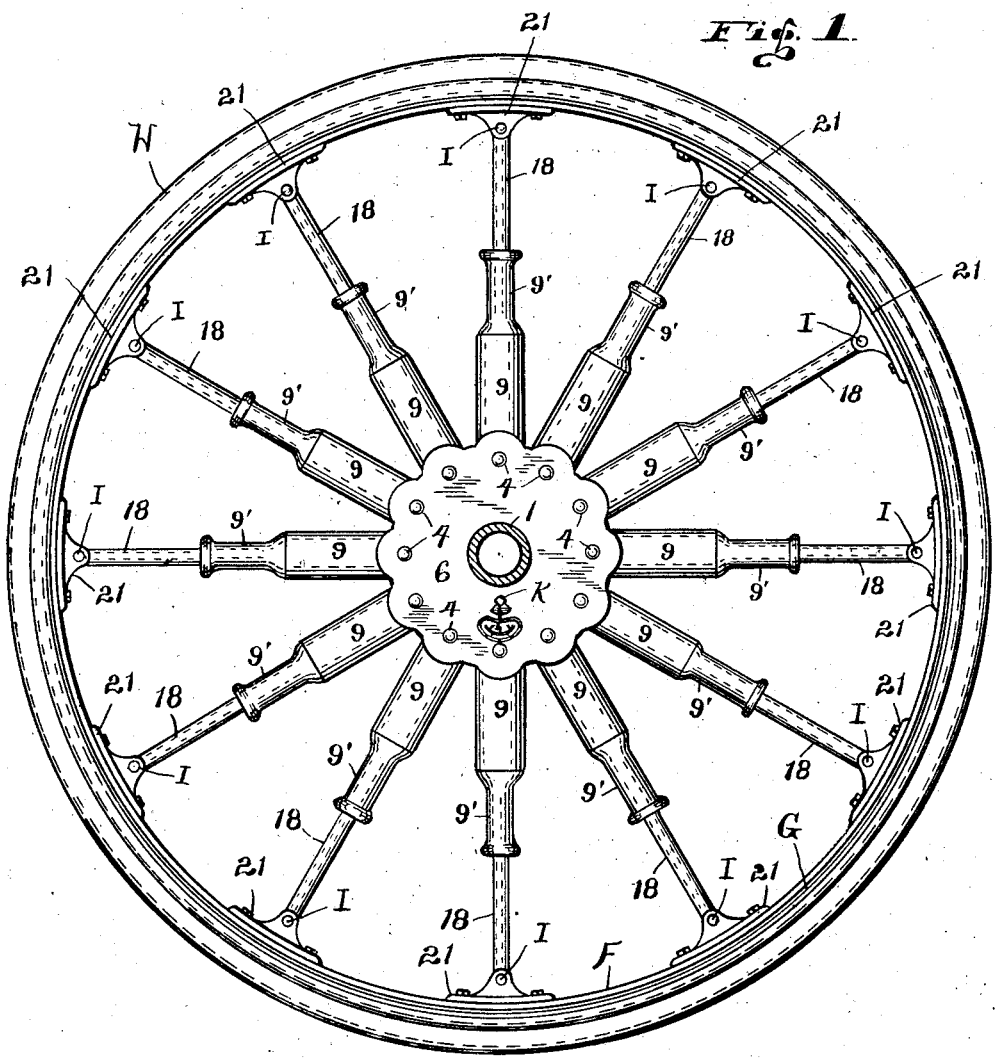
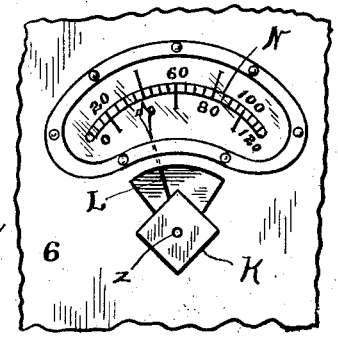

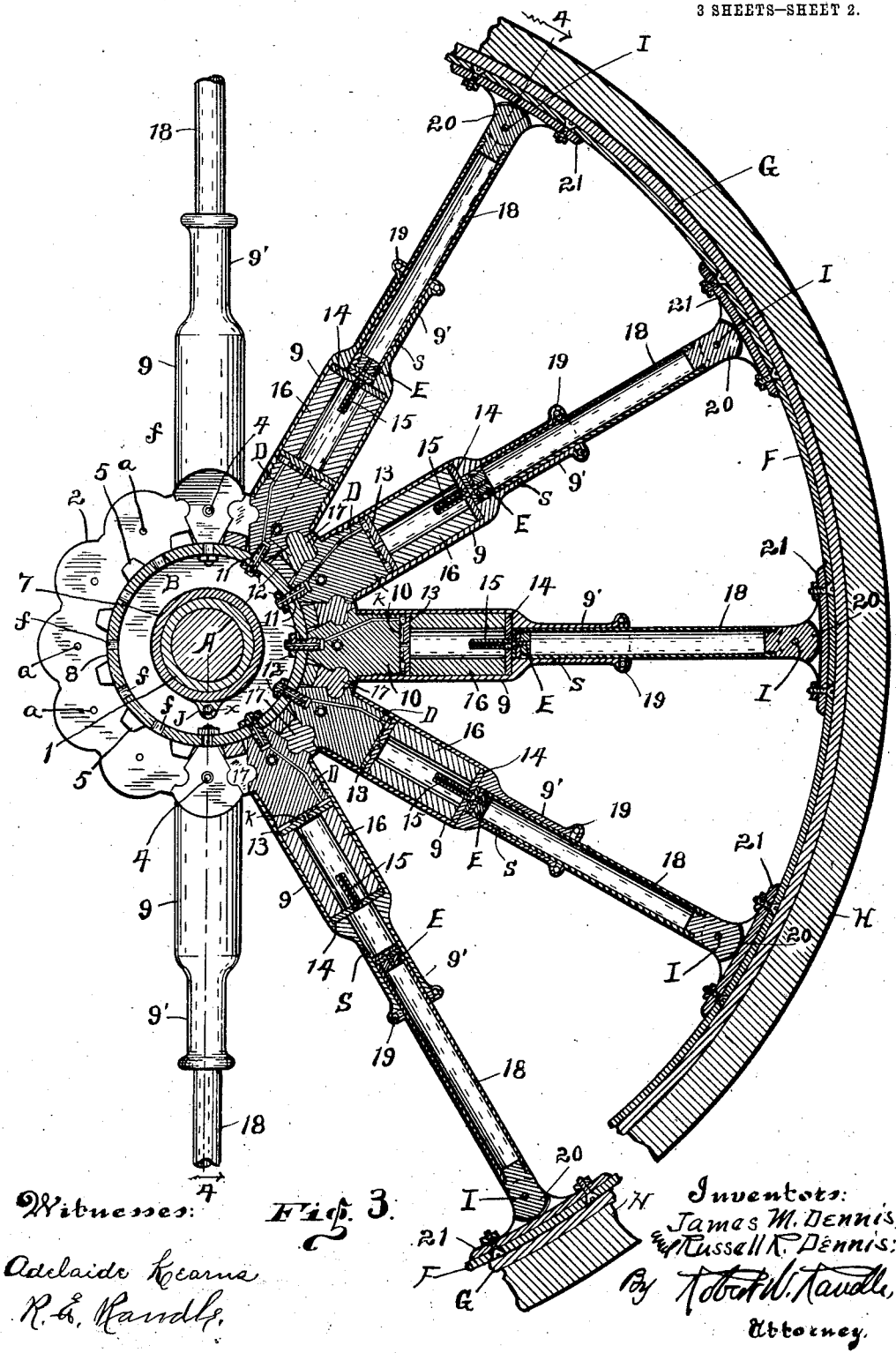

J. M. & R. R. DENNIS.
PNEUMATIC WHEEL.
APPLICATION FILED NOV. 23, 1911.
1,047,620.
Patented Dec. 17, 1912.
3 SHEETS—SHEET 3.
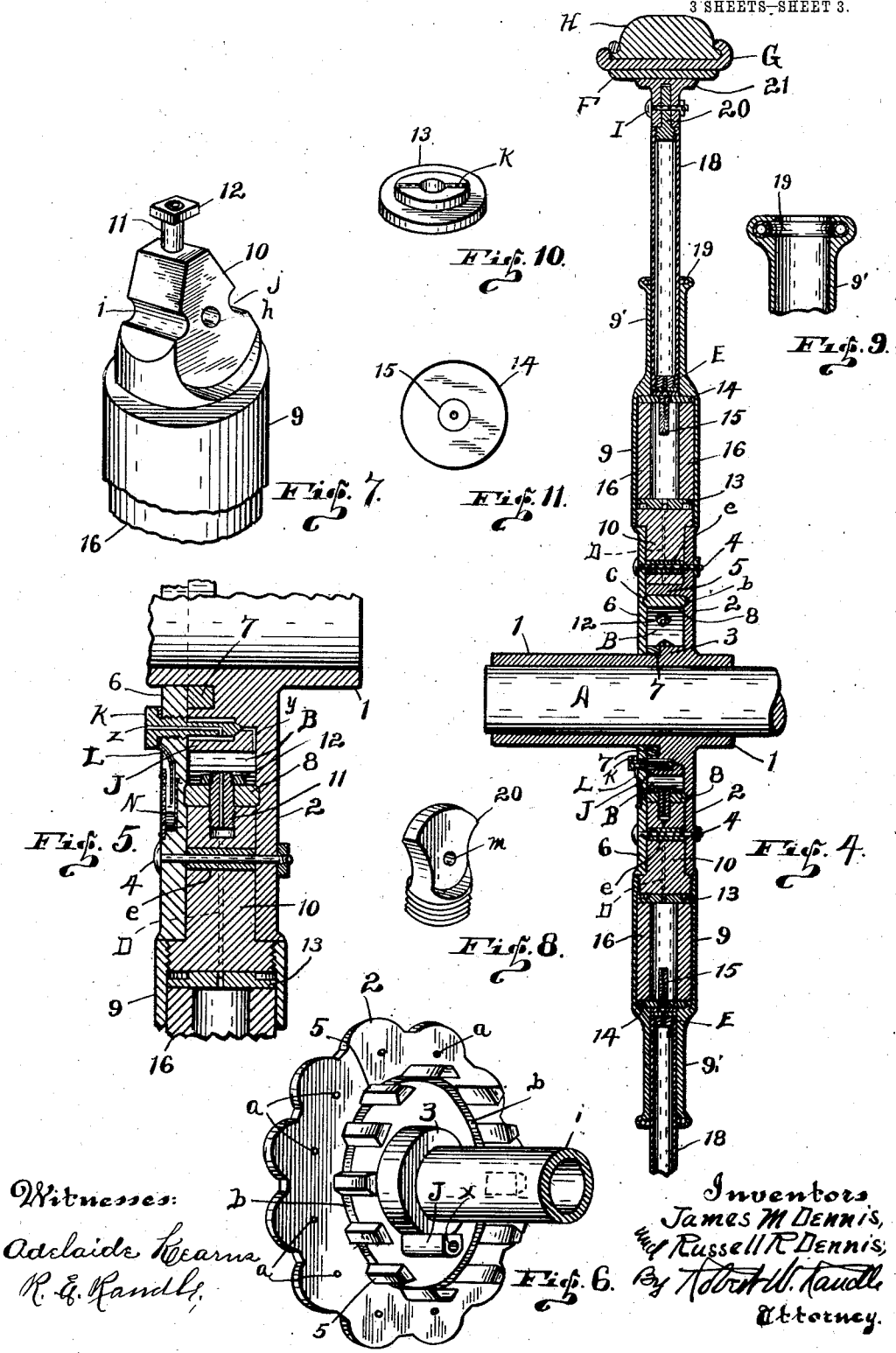

UNITED STATES PATENT OFFICE.

JAMES M. DENNIS AND RUSSELL R. DENNIS, OF CAMBRIDGE CITY, INDIANA, ASSIGNORS, BY DIRECT AND MESNE ASSIGNMENTS, TO INTERNATIONAL PNEUMATIC WHEEL COMPANY, A CORPORATION OF INDIANA.

PNEUMATIC WHEEL.

1,047,620.  Specification of Letters Patent.  Patented Dec. 17, 1912.

Application filed November 23, 1911. Serial No. 661,877.

*To all whom it may concern:*

Be it known that we, JAMES M. DENNIS and RUSSELL R. DENNIS, both citizens of the United States, residing in the city of Cambridge City, in the county of Wayne and State of Indiana, have invented certain new and useful Improvements in Pneumatic Wheels, of which the following is a specification.
The principle of our present invention depends upon the compressibility of air, that is to say on a plenum of air contained in an otherwise vacuity; and with means for controlling the air under pressure, in order to predetermine the resistance or the resiliency thereof, depending upon the weight of the body to be supported thereby.

The object of our invention, broadly speaking, is to provide a pneumatic vehicle-wheel which will exceed the resilient qualities of the ordinary pneumatic tires, yet employing solid rubber or cushioned tires on its periphery; at the same time providing a wheel which will be strong and durable in construction, artistic and attractive in appearance, automatic in operation, easily assembled and repaired, and which can be manufactured and sold at a comparatively low price.
More particularly stated, our object is to provide a vehicle wheel having a maximum of pneumaticity and adapted to be self inflatable: that is, wherein the air pressure is attained and maintained by the operation of the wheel, and maintained thereby at a desired predetermined pressure, depending upon the weight to be carried by the wheel.

Another object is to provide a wheel adapted for vehicular traffic, wherein an air-chamber is provided, with a plurality of air-pumping devices or mechanisms adapted to operate automatically by the revolution of the wheel and thereby cause the air-pressure in said air-chamber to be maintained at a predetermined degree of pressure or resiliency, and at the same time having means whereby the parts will not inadvertently become inoperative, through wear or otherwise.

The significant feature of our invention resides in a vehicle wheel which has a single chamber in its hub, with a plurality of spokes acting as isodynamous air pumps for compressing air into said chamber, thereby forming a cushion for absorbing the jars incident to the travel of the wheel; and a valve for controlling the degree of air-pressure in the chamber at any predetermined degree.

One manner for the construction of our invention, is shown in the accompanying drawings, in which—

Figure 1 is a face view of one of our wheels. Fig. 2 is an enlarged detail view of a valve for gaging the air pressure. Fig. 3 is an enlarged fragmentary view of parts of our wheel, showing same in central section. Fig. 4 is a cross section, as taken on line 4—4 of Fig. 3. Fig. 5 is an enlarged detail view showing the means for allowing the air to escape after the pressure has reached any predetermined degree. Fig. 6 is a perspective view showing the interior of the wheel hub. Fig. 7 is an enlarged perspective view of the inner end portion of one of the spokes of our wheel. Fig. 8 is an enlarged detail view of the outer end portion of one of the spokes. Fig. 9 is a central section of the outer end of the cylinder members of a spoke. Fig. 10 is an isometrical view of the inner disk of one of the spokes. And Fig. 11 is a plan view of one of the outer disks.

Similar indices denote like parts throughout the several views.

The central portion of our wheel is a hub comprising a thimble 1 which may revolve on the shaft A. Formed integral with and extending out at right-angles from the thimble 1 is the fixed plate 2. Extending inward, around thimble 1, from the central portion of the plate 2, is the collar 3.
Formed through plate 2, near the outer edge thereof, are a plurality of apertures *a*, each of which is adapted to receive therein a bolt 4. Extending inward from the inner face of the plate 2 are a plurality of lugs 5, all equi-distant from the center of the plate 2. Formed around in the inner face of plate 2, inside the circle formed by lugs 5, and adjoining said lugs, is a groove *b*.

Numeral 6 denotes a removable plate, which is of the same size as is the fixed-plate 2 of which it is a complement. Formed through the plate 6 are a plurality of holes each of which is in alinement with and corresponds with one of the holes *a*, and they are adapted to receive the other end of the respective bolts 4. The plate 6 has a central aperture therethrough in which may fit the thimble 1, allowing plate 6 to be brought to position as in Figs. 4 and 5. Surrounding thimble 1 and adjoining the collar 3 is a rubber gasket 7, against which the plate 6 will engage. Formed around in the inner face of plate 6 is a groove $c$ which is oppositely disposed to said groove $b$.

8 denotes a band, having one of its edges fitting in the groove $b$ and the other in groove $c$, being adapted to be clamped tightly in place when the bolts 4 are tightened. In order to prevent the plates 2 and 6 from being clamped too tightly, we provide a thimble for each bolt 4, as the thimbles $e$, thereby allowing the bolts to be made tight but preventing the plates from being brought too near toward each other. It will now be observed that an air-chamber B is formed between the band 8, the sides 2 and 6, the collar 3 and the gasket 7, which chamber extends entirely around the hub. As there are twelve spokes in this particular wheel therefore we form an equal number of apertures $f$ through the band 8 in which are located the nipples 11.

We will now describe the spokes, and as they are all alike we will simply describe one which will answer as a description for all: Each of the spokes is a complete air-pump per se, each consisting of a cylinder-casing 9, having a neck portion 9' extending out from its outer end. Secured to the inner end of cylinder casing 9 is the wedge-like head 10. The head 10 has an aperture $h$ therethrough through which passes one of the bolts 4. Extending centrally into the head 10, from the point thereof, is an aperture, which is at right-angles to said aperture $h$, into which is threaded the hollow nipple 11, which has a nut 12 threaded onto its free end. Also formed across in each side of the beveled portion of the head 10 are the half-round grooves $i$ and $j$ which are in alinement with the apertures $h$. Resting on the head 10, and located inside the cylinder casing 9, is a disk 13 having notches $k$ across its flange, as in Fig. 10. Letter D denotes an air duct leading from the interior of the cylinder, through notches $k$, and then through nipple 11 into the air-chamber B. Said air duct is thus placed at an angle in order to avoid the bolt 4 as indicated. Located in the outer end portion of the cylinder casing 9 is the disk 14 through which is a central aperture in which is threaded the valve 15 which is of any ordinary construction which will permit air to enter into the cylinder but will prevent its escaping back therethrough. Located around in cylinder casing 9 and extending between the disks 13 and 14 is a rubber cylinder 16 having a central air space therethrough.

In assembling the various parts of the wheel the nipples 11 are inserted through the apertures $f$ of the band 8, allowing the points of the heads 10 to rest on the periphery of the band 8, after which the nut 12 is run on each of the nipples thereby bringing the parts to the position shown in Fig. 3. Thus assembled it will be seen that the point of each head 10 will be located between two of said lugs 5. The bolts 4 may now be inserted through the plate 2 and through the heads 10. We now fill the spaces between each two of the heads 10 and one of the lugs 5 with a rubber packing 17 which should be driven in tightly to position, thereby forming dust-proof joints and also assisting in cushioning the spokes. Numeral 18 denotes the piston which fits and is adapted to operate in the neck 9', there being a packing-head E formed on the inner end in order to prevent the escape of air when the piston is being pressed inward. Formed around in the outer enlarged portion of the neck 9' is a channel in which is placed the ring packing 19 through which the piston operates, said packing preventing the escape of air therearound, this arrangement being clearly shown in Fig. 9.

In the outer end of the piston 18 is secured the ear 20 which is flattened as shown in Fig. 8, with a pivot aperture $m$ formed therethrough as indicated.

F denotes a band which is connected to the rim G, the latter being adapted to carry the tire H. Secured around in the inner periphery of the band F are the clips 21, in each of which is pivotedly secured the flat portion of one of said ears 20, being connected thereto by the pivot I which passes through the aperture $m$.

From the above it is apparent that both ends of each of the spokes are pivoted and that in such manner as to allow the spokes to have a limited movement circumferentially, that is at right angles to the shaft, but they will not be movable in an axial direction, that is parallel with the shaft.

The valve may be of any desired construction suitable to retain the air pressure in the chamber at the desired degree, for instance:—Located inside the main air-chamber B is the block J, which may be formed integral with the collar 3. A threaded aperture $x$ extends down centrally in an axial direction into the block J to receive therein the threaded tap-bolt K, which has a head on its outer end, the inner end thereof being pointed. Opening out into the air-chamber B from the interior of block J is an air duct $y$. Extending centrally into bolt K, and opening out at its inner end, is the air duct $z$ which is adapted to have its inner end closed. Secured to the outer portion of the bolt K is a hand or pointer L whose free end is adapted to move over the scale N. Said scale and pointer should be so arranged, on the face of the plate 6, that the pointer will always indicate, by its position with relation to the scale, the condition of the air pressure in the chamber B, or at least indicating the maximum to which the air pressure may attain in chamber B when the pointer is in a certain position.

The device just described is of the most simple character, as I do not intend to cover it specifically in this application. The operation thereof is as follows: If the bolt K be run in to its limit, that is with its point tightly inserted in one end of the duct $y$, it is apparent that no air under pressure can escape from the air-chamber B through the duct $y$, at which time the bolt K will be turned so that the pointer L will be turned to the right so that it will point to 120, for instance, which will be the limit of which the air pumps will operate, thereby making it practically a solid wheel after it has run for a short distance. Now by turning the bolt K to the left so that the pointer will denote 80, for instance, then the point of the bolt K will be slightly loosened in the duct $y$, thereby allowing a small amount of air under pressure to escape around the point thereof and then escape out through the duct $z$, thereby allowing the air under pressure to reach about 80 pounds, or that shown by the pointer. As the wheel revolves it is apparent that the several cylindrical spokes are continuously pumping air into the chamber, thereby keeping up the pressure to the point desired.

Letter $s$ denotes a very small inlet through which the air is taken as the piston is forced inward.

In practice our wheel is to be employed in the usual manner, from which it is apparent that as the wheel revolves, carrying a proportion of weight of a vehicle, that the lower pistons 18 will be forced inward, thereby forcing the air from the cylinders into the main chamber B. And as the wheel continues to revolve the pistons will move outward as they advance upward, and that without releasing the air pressure in the chamber B. As soon as the air pressure has reached to near the point shown by the indicator then the air pressure will form an air cushion for the piston, thereby absorbing the jolts and jars incident to the travel of the vehicle over the roadway. By means of the above it is apparent that we dispense with the necessity of the usual pneumatic tires. It is apparent however that in the event that no air can be used in the cylinders or the air chamber, or if it be desired to employ the wheel as a spring wheel without the pneumatic features then this will be possible as the inner ends of the piston will be cushioned against the rubber cylinders 16.

It is to be understood that the air pressure may be caused to reach a pressure not to exceed that shown by the indicator, the arrangement being such that when the pressure has reached any predetermined pressure then it will escape. In other words, by turning the bolt K the pressure may be made to not exceed a given point.

In the construction of our wheel we propose to form the several parts in such manner that friction and wear will be reduced to the minimum, for instance: We propose to form the cylinders 9 of "manganese bronze" and the pistons 18 of "steel", however we are not to be limited to any particular materials or to any combinations thereof.

We desire that it be understood that we are not to be limited to the exact details of construction herein shown and described, but that various changes may be made therein.

Having now fully shown and described our invention and the best means for its construction to us known at this time, what we claim and desire to secure by Letters Patent of the United States, is—

1. A vehicle wheel having a solid rim, a hub which includes a spindle, a fixed plate integral with the spindle, a detachable plate surrounding the spindle and being a complement of the fixed plate, a row of lugs extending in an axial direction from one plate toward the other plate, a band extending around between the plates forming the outer wall of an air-chamber, a plurality of cylinders pivoted between the plates and extending outward therefrom, there being ducts leading from the interior of each cylinder to the interior of the hub, a packing inserted between each two of the cylinders at their pivotal connections, a cylindrical resilient member located within each cylinder, a valve located at the outer end of each cylinder, a piston operative in the outer portion of each cylinder, and a pivotal connection between the outer ends of the pistons and said rim.

2. A vehicle wheel having a one-piece rim, a hub having an air chamber therein and including a spindle, a fixed plate integral with said spindle, a removable plate disposed around the spindle and being a complement of the fixed plate with which it is oppositely disposed, a collar formed integral with the spindle and the fixed plate and located between said plates, a gasket located between said collar and the removable plate, a band extending around between the plates at a distance from said collar, a row of lugs disposed around adjoining said band and formed integral with one of said plates, a plurality of wedge shaped heads located between said plates, means for connecting each of said heads to said band, means for pivoting each of said heads to said plates, a resilient packing located between each two of said heads, a cylinder secured to each head and extending outward therefrom, a piston operative in each cylinder, a cushion located in each cylinder, and means for pivoting the outer ends of said pistons to said rim.

3. A vehicle wheel having a one-piece rim, a hub having an air chamber therein and located normally concentric with the rim, means for pumping air into the air chamber of the hub including a plurality of heads pivoted in the outer portion of the hub and radiating therefrom, a cylinder extending from the outer portion of each head, a neck extending outward from each cylinder, a piston operative in each neck, a hollow cushion located in each cylinder, there being interior communication between the interior of each cushion and the air-chamber in the hub, a piston head located on the inner end of each piston, a disk closing the upper end of said cushion and with which said piston head is adapted to engage, a valve located in said disk, means for pivoting the outer ends of the pistons to the rim, and means for controlling the air pressure in the air chamber, substantially as set forth.

4. A vehicle wheel including the rim, a hub having an air-chamber therein, the sides of said hub being formed of two corresponding plates, a band separating said plates and forming the outer wall of the air-chamber, a plurality of lugs extending across between said plates and adjoining the periphery of said band, a plurality of heads pivoted between said plates each being disposed between two of said lugs with their inner ends in contact with said band, means for connecting each of said heads to said band, a cylinder secured to and extending out from the outer end of each of said heads, there being interior communication between the cylinders and said air chamber in the hub, a neck extending out from each cylinder, a valve preventing passage from the interior of each cylinder to the interior of the respective necks, a piston operative in each neck and adapted to force air in the respective cylinders through their respective valves, means for allowing for the escape of air from the air chamber after the pressure has attained a predetermined degree of pressure, and means for pivoting the outer ends of the pistons to the rim.

5. A vehicle wheel having a one-piece rim, a hub comprising a fixed plate and a removable plate which are complements of each other, a plurality of lugs arranged around concentric with the plates and located in an axial direction therebetween, a band extending around in contact with said lugs and connecting said plates, a plurality of heads pivoted around between said plates with their inner ends in contact with said band, a hollow nipple extending in through said band from each of said heads, nuts securing said heads to the band, a cylinder extending out from each of said heads, there being an air passage leading through each head from the interior of the nipple to the interior of the respective cylinders, a neck formed integral with and extending out from each cylinder, a valve controlling the passage of air between the interior of the cylinder and the interior of the neck, a piston operative in each neck, a plurality of clips secured around on the inner periphery of the rim, means for pivoting the outer end of each piston in one of said clips, means for pumping air into the interior of the hub by the operation of the spokes, and means controlling the air pressure in the interior of the hub.

6. A vehicle wheel having a rim, a hub which includes a fixed plate and a detachable plate, a row of lugs extending inward from one plate toward the other plate, a band extending around between the plates forming the outer wall of an air-chamber, a plurality of cylinders pivoted between the plates and extending outward therefrom, there being interior communication between all of the cylinders and said air-chambers, a packing located between each two of the cylinders at their pivotal connections, a cylindrical resilient member located within each cylinder, a valve located at the outer end of said cylinder, a neck projecting out from the outer end of the cylinder, a piston operative in said neck, and a pivotal connection between the outer end of the piston and the rim.

In testimony whereof we have hereunto subscribed our names to this specification in the presence of two subscribing witnesses.

JAMES M. DENNIS.
RUSSELL R. DENNIS.

Witnesses:
ROBT. W. RANDLE,
R. E. RANDLE.